United States Patent Office 3,623,893
Patented Nov. 30, 1971

3,623,893
PRESSURE INFUSION FOOD STABILIZATION
Conrad E. Mauge, New Rochelle, N.Y., assignor to General Foods Corporation, White Plains, N.Y.
No Drawing. Filed Sept. 10, 1968, Ser. No. 758,686
Int. Cl. A23b 1/04, 7/02
U.S. Cl. 99—204                                      4 Claims

ABSTRACT OF THE DISCLOSURE

Using superatmospheric pressure to infuse a food with solution of stabilizing solutes, while attaining a moisture reduction to a more stable level, foreshortens the requisite period for treatment and effects a more uniform treatment with fewer changes in food texture.

BACKGROUND OF THE INVENTION

This invention relates to a process for the stabilization of food, and more particularly it is concerned with a process for the infusion of stabilizing solutions in plant and animal tissue so as to render such foods desirably stable.

Heretofore, it has been suggested that plant and animal tissue may be stabilized by the infusion therein of a stabilizing solution high in solutes such as a polyhydric alcohol like glycerol, the stabilizing solution being of such solutes concentration and amount as to cause the solutes to infuse the morphology of the plant or animal tissued and through exchange of the moisture therein with the solutes, effect a desired moisture reduction or "dehydration." Thus, a plant material may be immersed in a concentrated glycerol solution containing also effective amounts of optional other stabilizing adjuncts such as sugar and/or salt and an antimycotic like potassium sorbate; the plant material may be previously or contemporaneously subjected to an elevated cooking temperature whereat the produce will be pasteurized, any undesired pathogens therein will be effectively "killed" and any latent enzymic activity that is undesired will be arrested, or controlled. Incident to such so-called cook-soak infusion wherein the produce is immersed in an excess of stabilizing solution containing such solutes, the moisture content of the produce which may be originally in excess of 60% and more commonly in excess of 70%, will be reduced to a moisture content say substantially below 40%. By virtue of the high concentration of the stabilizing solute in the infusing solution, the moisture present in the produce will be reduced and, in effect, replaced by the stabilizing solute which desirably, in the case of glycerol and polyhydric alcohol of like character, will offer a desired "wetness." Such practices do offer an advance in the art in that they promote bacteriostasis and overall microorganic stability. Such treated produce in the so-called intermediate moisture range of 15 to 35% and even as high as 40% are essentially shelf stable when cold-packaged aerobically. Products of such an infusion technique can be stored without refrigeration or aseptic canning, and generally offer the opportunity to eliminate any commercial sterilization techniques commonly practiced in present day canning operations.

However, to effect such an infusion as provides the desired high concentration of stabilizing solution and the solutes thereof necessitates a prolonged soak time—not only to afford the requisite heat treatment that initiates pasteurization or cooking treatment, but also to assure the stabilizing solute adequately, completely and desirably uniformly is distributed throughout the morphology of the plant or animal tissue. It is not uncommon, therefore, in order to effect such "dehydration" and the requisite stabilization that such infusion including the cooking operation, will require a total of elapsed period for immersion in excess of a practical working shift and will exceed, in most instances, 6–10 hours, and may call for a prolonged immersion of as long as 24–48 hours. Such prolonged immersion in some animal tissue and some plant tissue is accompanied by an undesired modification in the texture and overall eating quality of the produce and also the loss of soluble solids. Thus, the turgor of such plant material as tomatoes, leafy vegetables like lettuce, will be so altered that the desired texture for good organoleptic acceptability will be sacrified, or in any event less than desired. This loss of turgor stems not only from the elevated temperatures practiced to effect or accelerate infusion, but also from the overall exposure time that is necessitated to effect the desired infusion. Similarly, in the case of animal tissue, rather than an exchange of stabilizing solute for pristine water, there will be a change in the cell structure which is akin to an edematous condition.

Moreover, the changes in the lattice structure and texture will vary for the given types of tissue being treated, and it becomes desirable, therefore, to predictably and controllably effect the desired "dehydration" and substitution of stabilizing solutes.

It is the object of the present invention to provide a method whereby the desired stabilization of plant or animal tissue may be effected in a controllable and predictable manner over a comparatively foreshortened period of time whereby a texture more closely approximating that desired is obtained without the accompanying loss in texture that may stem from prolonged immersion in a stabilizing solution.

SUMMARY OF THE INVENTION

In accordance with the present invention this object is accomplished by immersing plant and/or animal tissue in a stabilizing solution having a concentration of water soluble compound sufficiently high to effect the intended substitution for moisture present in said tissue while maintaining the zone of immersion under a pressure substantially in excess of atmospheric pressure and typically under a vessel headspace pressure substantially in excess of 15 p.s.i. and commonly under a headspace pressure ranging anywhere from 200 to 4000 p.s.i., whereby stabilizing solutes are uniformly distributed throughout the food and the food's $A_w$ (as defined herein) is reduced to less than 0.90 and preferably is above 0.75. By effecting the substantially elevated headspace pressure above the zone of immersion it has been found that the period required in a variety of plant and animal tissue to achieve the collateral dehydration as that term is defined herein, is greatly reduced. Commonly it will be found that the total lapsed time required for immersion infusion will be foreshortened by 50% or more relative to infusion at normal atmospheric pressure and generally it has been found that the desired infusion with stabilizing solute such as glycerol and like polyhydric alcohol may be effected in a matter of less than 6 hours and typically in a period less than 4 hours.

DETAILED DESCRIPTION OF THE INVENTION

For most plant tissue having a delicate lattice structure such as tomato and lettuce, desired solution infusion will be in the order of 30 to 240 minutes, whereas for most animal tissue, such as ham and the like, desired preservation may be effected in longer periods—say in the neighborhood of one to four hours, the extent of immersion being to some degree determined by the density as well as the size of the specimen being treated. A piece of corned beef of equal size to a like cube or similar chunk of ham, will be found to admit the stabilizing solution at a much greater rate—all other things remaining constant.

Usually it will be found that the headspace pressure can be created by introduction of a compatible gaseous atmosphere such as nitrogen although other gases capable of generating a sufficiently elevated headspace pressure may be employed, e.g., oxygen. The headspace pressure will be maintained during a majority of the period during which immersion of the specimen in the stabilizing solution is practiced until the moisture content of the specimen has been reduced to, say less than 50%. Commonly the desired headspace pressure will be practiced as early as practicable within the infusing vessel, although it is not essential that the produce be subjected to superatmospheric pressures immediately upon immersion. Likewise, it will not be essential that the specimen be maintained in the zone of immersion throughout the entire infusion operation, although for most practical application it will be found advantageous to maintain superatmospheric headspace pressure in the infusion zone for the majority of the total elapsed period required to effect infusion of stabilizing solutes. What is desired in accordance with the invention is that the headspace pressure be maintained at a sufficiently elevated state for a sufficiently prolonged period that the immersed specimen is caused to admit the stabilizing solute as rapidly as practicable.

After a raw food or a cooked food has been maintained under an elevated superatmospheric pressure for a period in the aforestated range, the moisture content of the food and the water activity thereof will be reduced to a level whereat it is capable of being maintained microbiologically stable at room temperature even when packaged under aerobic conditions at subpasteurization temperatures. Usually in less than 4 hours this stabilization will be effected without causing the plant or animal tissue to undergo a sufficient degree of dehydration that it must be rehydrated substantially to an edible state; thus by maintaining the total elapsed immersion time less than 6 hours and commonly less than 4 hours so the specimen will not be caused to undergo at some points an undue moisture reduction such that regions of the specimen will have a moisture content not less than 15%. The period of infusion treatment will be primarily determined by the water activity desired for the product.

Water activity of the respective food solids will be predetermined in order that the solids will provide requisite bacteriostatic and overall microorganic stability under the anticipated conditions of treatment preparatory to packaging, during packaging and during storage. Such stability determination will be made by formulating and infusing the respective solid phases so as to provide a desired $A_w$, i.e., the relative humidity of a headspace atmosphere in equilibrium with the food or liquid, $A_w$ being customarily expressed as a decimal fraction of one and being so expressed herein and said atmosphere being understood to be that sensed by a hygrometer in a substantially hermetically sealed chamber. Thus, the $A_w$ can be determined by inserting the specimen in an airtight jar and after storage for a suitable period of 24 hours to assure equilibrium, the relative humidity of the air or headspace in the jar will be measured using a hygrometer.

For most applications contemplated herein, the respective food solids will have $A_w$'s of 0.60 to 0.90, the specific $A_w$ of use being dependent on the nature of the food.

Generally, it will be preferred to formulate such phases at an $A_w$ above 0.75 inasmuch as most foods are more flavorful and organoleptically acceptable at the higher $A_w$. On the other hand, as one approaches the upper part of the range, it becomes more difficult to consistently preserve the particular food solid and so most products will cautiously have an $A_w$ less than about 0.85.

Customarily, it will be found practical to pasteurize the food solids phase by infusion at an elevated temperature, say in excess of 160° F., the pasteurization being carried out sufficiently to at least kill any pathogens or inactivate enzyme, a common range of immersion heating temperatures will be 180° F. to 210° F. for 15 to 25 minutes depending upon desired product texture of the food solids.

DESCRIPTION OF PREFERRED EMBODIMENTS

Example I 1100 grams cubed fresh pork pieces were immersed and cooked at 210 to 220° F. in 1700 gms. of an infusing solution for 15 minutes, the infusing solution having the following constituency:

| Infusion solutions | Percent | Grams |
|---|---|---|
| Glycerol | 74.9 | 1,348.0 |
| Water | 14.1 | 260.0 |
| Sodium chloride | 5.6 | 99.1 |
| Propylene glycol | 5.1 | 90.1 |
| Potassium sorbate | 0.3 | 5.0 |

The cubed pork pieces with the infusion unabsorbed solution was then transferred to a Parr 2-liter pressure reaction autoclave, wherein the pieces were subjected to processing in accordance with this invention. The Parr 2-liter pressure reaction autoclave is a stainless steel reaction bomb with a motor driven stirrer and an electric bomb heater, all assembled on a steel base plate. It has fittings for introducing compressed gas while aigtating and heating, or for removing liquid samples while under pressure, or for bleeding gas from the bomb chamber. The bomb also has a pressure gauge, and a means for controlling the temperature by a variable voltage transformer mounted on the base plate. The stirrer shaft can be cooled with circulating water. The temperature is read from a dial thermometer inserted in the bomb thermowell, and there is an internal cooling coil, through which the bomb can be cooled by circulating cold tap water at 50°–70° F. The bomb's headspace pressure was brought up to 1000 p.s.i.g. using nitrogen, and the specimen was retained in the vessel for 3 hours. Thereafter pressure in the bomb was released, solution was drained and cubed pork pieces were withdrawn having an $A_w$ of 0.70. The pork pieces had a moisture content in the order of 26%.

Example II

Fresh diced celery mixed with fresh sliced cucumbers and fresh tomatoes and having an average moisture content of about 94%, were placed in a stabilizing solution having the following constituency:

| Ingredient: | Parts by weight |
|---|---|
| Propylene glycol | 2.0 |
| Potassium sorbate | 0.3 |
| Water | 44.1 |
| Glycerol | 30.0 |
| Salt | 3.0 |

225 grams of the celery, cucumber and tomato mixture were placed in the 2-liter Parr bomb containing approximately 800 grams of stabilizing infusion solution (approximately 650 ml.). The charge material in the bomb was subjected to a super-atmospheric pressure of 1,000 p.s.i.g. nitrogen for 3 hours, whereafter pressure was released, infusion solution remaining uninfused was drained and the produce was withdrawn. The celery, cucumber and tomato pieces retained a desired turgor in that celery was judged to be crisp, the cucumbers were also crisp, and the tomato slices were not sodden. The treated specimen had an $A_w$ of 0.79 and could be stored indefinitely at room temperature in a Saran Wrap bag.

Example III

Intermediate moisture pickles and olives. A stabilizing solution for infusing a mixture of pickles and olives was prepared as follows:

| Ingredient: | Parts by weight |
|---|---|
| Propylene glycol | 2.0 |
| Potassium sorbate | 0.3 |
| Water | 30.9 |
| Glycerol | 25.0 |
| Salt | 2.5 |

362 grams of the infusing solution for each 100 grams of pickles and olives having an average moisture content of 60.7% were charged to the 2-liter Parr bomb described hereinabove. The pickle and olive mixture was placed as before under 1,000 lb. per square inch gauge nitrogen headspace pressure for 3 hours as above. Whereafter the vessel was drained and samples removed as before. The pickle and olive mixture had an $A_w$ of 0.793 and had a desirable turgor reminiscent of good quality pickles and olives.

While the foregoing specification has been described by reference to specific operative examples, it is by no means limiting and the solute or solute range of use in accordance with the infusion may include in addition to a polyhydric alcohol or in lieu thereof other functionally effective solutes such as sugar and salt as those terms are commonly understood and defined in U.S. Pat. No. 3,202,514.

What is claimed is:

1. Process for the stabilization of raw and cooked food tissue selected from the group consisting of plant tissue and animal tissue which comprises:
    (a) creating a stabilizing solution having a high concentration of stabilizing glycerol solute;
    (b) immersing the food tissue in the stabilizing solution, the glycerol concentration of said stabilizing solution and the quantity of said solution being sufficient to cause the glycerol thereof to infuse the food tissue and undergo exchange of moisture therein with the glycerol and thereby effect a desired moisture reduction in the food tissue; and
    (c) subjecting the immersed food tissue to a superatmospheric pressure ranging from about 200 to about 4000 p.s.i. for a period of time of less than 4 hours to infuse the food tissue with glycerol and effect a moisture reduction in the food tissue to a level ranging from about 15% to about 50% of the food tissue weight whereby the moisture content of the food tissue and the water activity thereof will be reduced to a level whereat the food tissue is capable of maintaining microbiological stability at room temperatures.

2. The process according to claim 1 wherein the stabilizing solution contains an antimycotic solute.

3. The process according to claim 2 wherein the antimycotic is potassium sorbate.

4. The process according to claim 1 wherein the stabilizing solution further contains a solute selected from the group consisting of sugar, salt, propylene glycol and mixtures thereof.

References Cited

UNITED STATES PATENTS

| 2,806,793 | 9/1957 | Kemps | 99—107 |
|---|---|---|---|
| 3,053,667 | 9/1962 | Luijerink | 99—107 |
| 3,202,514 | 8/1965 | Burgess | 99—107 |
| 2,420,517 | 5/1947 | Brandner | 99—204 |
| 2,354,495 | 7/1944 | Bodenstein | 34—9 |
| 2,355,394 | 8/1944 | Ross | 34—9 |
| 3,194,662 | 7/1965 | Nelson | 99—107 |
| 3,245,800 | 4/1966 | Sanders | 99—107 |
| 3,511,671 | 5/1970 | Miles | 99—208 |

FOREIGN PATENTS

| 290,728 | 5/1928 | Great Britain. |
|---|---|---|

OTHER REFERENCES

Pressure Cookery; Leon R. Carroll, M. Barrows & Co., Inc., New York; 1947, pp. 29, 80, 81.

NORMAN YUDKOFF, Primary Examiner

M. G. MULLEN, Assistant Examiner

U.S. Cl. X.R.

99—208; 34—9